United States Patent [19]

Steiner

[11] Patent Number: 4,859,195

[45] Date of Patent: Aug. 22, 1989

[54] CONNECTING CLAMP FOR WARP STOP MOTION

[75] Inventor: Ernst Steiner, Richterswil, Switzerland

[73] Assignee: Grob & Co., Aktiengesellschaft, Horgen, Switzerland

[21] Appl. No.: 225,772

[22] Filed: Jul. 29, 1988

[30] Foreign Application Priority Data

Aug. 22, 1987 [DE] Fed. Rep. of Germany ....... 3728071

[51] Int. Cl.[4] ........................ H01R 9/09; C03D 51/28

[52] U.S. Cl. ...................................... 439/55; 139/358; 139/369

[58] Field of Search ................... 439/55, 66, 121, 122, 439/824; 340/52 E; 139/369, 358

[56] References Cited

U.S. PATENT DOCUMENTS 3,004,131 10/1961 Nystuen ............................... 439/55

4,367,771 1/1983 Baumann ............................ 139/358

*Primary Examiner*—Neil Abrams
*Assistant Examiner*—Khiem Nguyen
*Attorney, Agent, or Firm*—Watson, Cole, Grindle & Watson

[57] ABSTRACT

The contact clamp having a plurality of slots for the contact bars comprises a cover designed as circuit board. It includes at its inner side a plurality of conductors which respectively connect a metallic disk located at the other end of the conductor which pin belongs to a multiple contact plug located on the top of the casing. Two metallic disks located laterally adjacent are allocated to one contact bar including two conductor bars and elastically supported contact pins urged against the conductor bars contact mentioned disks. The separate electrical circuit for every contact bar formed by respective two conductors allows a connection of every contact bar to an individual indicating device.

7 Claims, 2 Drawing Sheets

CONNECTING CLAMP FOR WARP STOP MOTION

BACKGROUND OF THE INVENTION

1. Field of the Invention

The present invention relates to a connecting clamp for warp stop motion operative for a conducting of electrical current to a plurality of adjacently located contact bars, each consisting of mutually insulated conductor bars and held in a casing consisting of an insulating material and pressed by a releasably mounted casing part against contact pins resiliently supported in every slot bottom.

2. Description of the Prior Art

The conductor bars of all contact bars of hitherto known designs of such contact clamps are respectively connected in parallel to electrical conductors which extend in the form of current-conducting bars through the casing consisting of an insulating material and are electrically connected toa plug located at the outside of the casing, from which plug a cable extends in turn to an apparatus by means of which the textile machine which is equipped with a warp stop motion is stopped when, due to breakage of a yarn, one of the falling drop wires interconnects the two conductor bars of one contact bar in an electrically conductive manner. A warp stop motion comprises as a rule a plurality of mutually parallel arranged contact bars and after a breakage of a yarn one of the numerous drop wires provided has fallen and must be localized in order to attend to the yarn breakage. The detecting of the respective drop wire of all the drop wires located in the customary warp stop motions on up to twelve adjacently arranged contact bars is time consuming, which causes a correspondingly long shutdown of the machine. Thus, it would be already a gaining of time in case of a yarn breakage if it would be known from the outset on which of the contact bars the fallen drop wire has to be searched for. This would necessitate that each one of the contact bars is connected individually to an indicating device which allows an immediate identification of the respective contact bar by the electrical signal triggered by the falling of the drop wire and causing the shut-down of the machine. The object of the contact clamp is to produce an electrically conducting connection from a central supply line to all contact bars and specifically via a plug arranged at the contact clamp such to allow a speedy disassembling of the electrical connection and the contact clamp when a new weaving warp is to be placed and the contact bars re-inserted. Accordingly, the contact clamp would have to have a plurality of wires leading to the contact pins for the individual contact bars and an accordingly large number of soldering junctions would have to be provided. These would, however, be exposed to the permanent strong vibrations to which the warp stop motion is subjected in addition to the otherwise high loadings. The soldered junctions would not stand up to such strains and the operation would not be reliable such that until now always only one common electrical connection from a plug at the contact clamp to all contact bars has been provided and in form of elastically yielding electrical conduits, either with a cooperation of resilient members between contact pins and electrically conductive bars or in form of an electrically conducting cntact foil extending laterally to all contact bars which foil is cushioned at the bottom by an elastic material.

SUMMARY OF THE INVENTION

It is, therefore, a general object of the present invention to obviate the difficulties regarding the electrical connection stemming from the high mechanical loadings and to provide from every single contact bar a separate electrical connection to a plug via which also a forwarding of the signal to a separate respective indicator device for every contact bar is possible.

A further object is to provide a connecting clamp in which all contact pins are supported via springs against a circuit board mounted to the casing thereof, which circuit boards are provided with conductors for the electrical connection between contact disks mounted on the circuit boards for contacting one spring each with pins of a multiple contact plug located at the outer side of the casing for a connection to indicator facilities of which each is allocated individually to one of the contact bars. Due to the suitable design of a part of the casing of the contact clamp as a circuit board all soldered juctions which are trouble prone are done away with, the production is simplified and less expensive and a decrease of the dimensions of the contact clamp is arrived at, too. There are basic advantages which go along with the decisive advantage of a separate indication for every single contact bar when realizing the new contact clamp.

BRIEF DESCRIPTION OF THE DRAWING

The invention will be better understood and objects other than those set forth will become apparent when consideration is given to the following detailed description thereof. Such description makes reference to the annexed drawings, wherein.

DETAILED DESCRIPTION OF THE PREFERRED EMBODIMENTS

Figure 2:
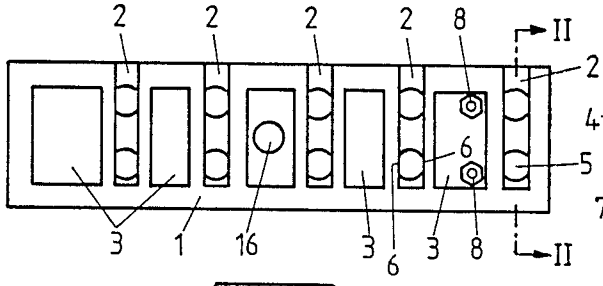
FIG. 2 is a bottom view of the casing without bottom.
Figure 3:
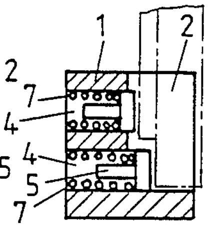
FIG. 3 is a view of a section through the casing along line II—II of FIG. 2.

The contact clamp includes a casing 1 consisting of an insulating material in which a row of mutually parallel slots 2 are formed which are located at a distance from each other and are open towards the bottom side of the casing 1 and do not extend completely through the casing. Due to manufacturing reasons recesses 3 are formed between respective slots 2, which recesses extend from the bottom side into the casing such as illustrated in FIG. 2. The slots are intended to receive contact bars as indicated in FIG. 3. These contact bars consist of two conductor bars which are electrically insulated with respect to each other and of which one has an U-shaped cross-section and encloses one second conductor bar located therein and projecting over the U-shaped bar such that the upper edges of the two conductor bars are located at different height levels. Accordingly, the contact pins 5 located in bore holes 4 in the casing 1 and extending respectively up to the slot 2 are also located at different levels such as indicated in FIG. 3. One row of contact pins 5 projects respectively onto the conductor bar having the U-shaped cross-section and the other row against the somewhat higher inner conductor bar, which bars form together the contact bar. When the contact bars are not present the contact pins 5 project onto abutment surfaces 6, which are located at each slot 2 at its opposite sides due to the fact that the diameter of the bore holes 4 is larger than the width of the slot 2. At the slot base located on top according to the illustration of FIG. 1 the contact pin 5 projects somewhat into the slot such to be in contact with one conductor bar and in case of the conductor bar being absent it is urged by a spiral pressure spring 7 against the abutment surfaces 6 which limit the mobility of the contact pins.

Figure 4:
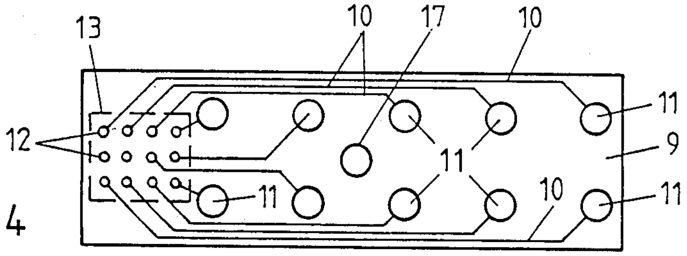
FIG. 4 is a view of the casing cover designed as circuit board seen from the inside.

The casing 1 is connected by means of a plurality of screws to a circuit board 9 consisting of an insulating material which covers the entire casing like a lid. The circuit board 9 includes at its inner side illustrated in FIG. 4 conductors 10 and specifically in the embodiment illustrated here a number of separate conductors 10 corresponding to the number of contact pins 5 are provided. The circuit board can be a printed circuit board. One end of every conduit 10 is formed by a metallic contact disk 11 connected electrically to the conductor against which one respective spiral pressure spring 7 rests. The other end of every conduit 10 is connected respectively with one pin of a multiple contact plug 13 which extends towards the outside of the casing cover 9 which multiple contact plug 13 is rigidly mounted to the upper side of the casing cover 9. This multiple contact plug is intended for receipt of a counter plug (not illustrated in the drawing) and serving as connector to indicating devices of which one each is allocated to one individual of the contact bars. These devices allow an indication, for instance optically, onto which of the installed contact bars a drop wire has fallen due to a yarn breakage and thereby has interconnected the two conductor bars of the contact bar electrically conductive which leads to the triggering of the shut-down of the machine.

Figure 5:
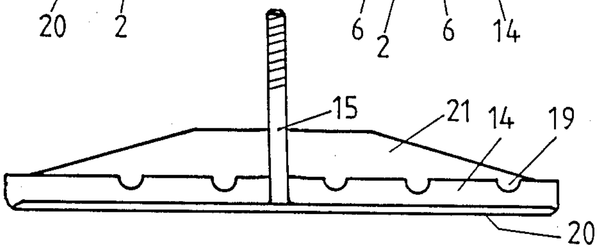
FIG. 5 is a side view of the bottom of the casing.
Figure 6:
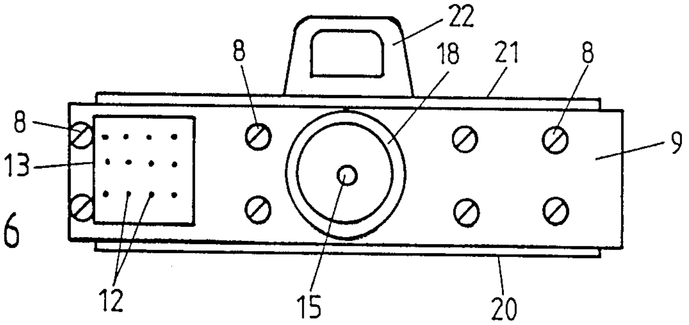
FIG. 6 is a top view of the contact clamp.

In order to allow a fast assembling of the contact clamp after the inserting of the contact bars a casing bottom 14 of an insulating material and illustrating in FIG. 5 is fixedly mounted at its center to a threaded bolt 15 extending through a through bore 16 in the casing 1 and through a further bore hole 17 in the casing top 9. A nut 18 designed as rotation handle knob is threaded onto the threaded bolt 18 such that upon a tightening thereof the casing 1, the casing cover 9 and the casing bottom 14 are fixedly mounted to each other. The slots 2 in the casing 1 continue into correspondingly shaped recesses 19 in the casing bottom 14 such that the contact rails and the casing bottom are additionally centered relative to each other. A metallic supporting rail 20 which embraces the casing bottom 14 which consists of an insulating material at its lower side consists of an angle profile and carries at the leg 21 extending upwards a large eyelet 22 through which a not illustrated leg of a lever used as commonly known to move the entire apparatus of the warp stop motion back and forth can be led, which lever is also termed searching or detecting lever.

Figure 1:
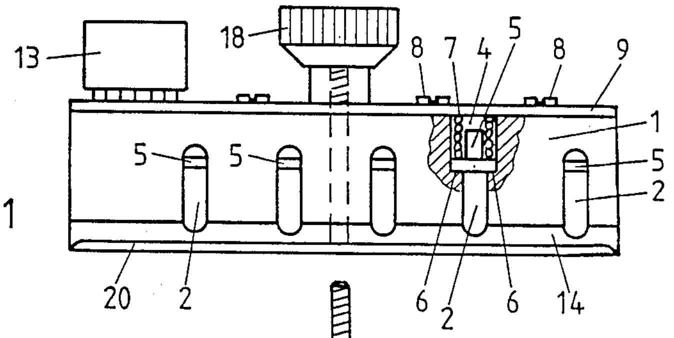
FIG. 1 illustrates a side view of a complete contact clamp.

According to an embodiment deviating from the embodiment of FIG. 1, the circuit board is arranged between a separate casing cover covering same and the casing. In this embodiment not illustrated in the drawing the casing cover supports a plurality of indicator fixtures electrically connected to the contact pins, such as illuminating diodes which respectively indicate optically on which of the contact bars a drop wire which has fallen upon a yarn breakage the two conductor bars have been connected electrically, Optical indicator devices could be installed at a suitable location of the textile machine separate from the contact clamp as well.

Figure 8:
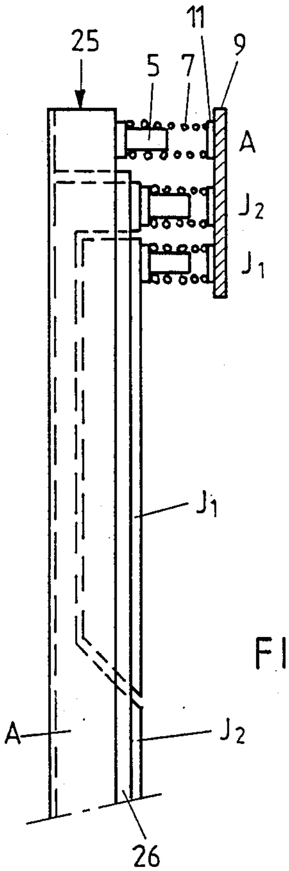
FIGS. 7 and 8 illustrate a view from the inside and of the cross-section of a further embodiment of the circuit board, inclusive contact pins and contact bar.
Figure 7:
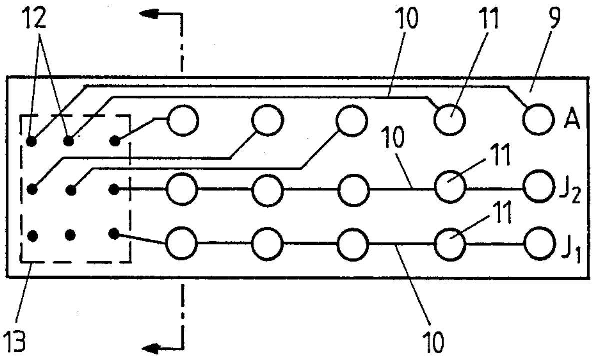
Figure 9:
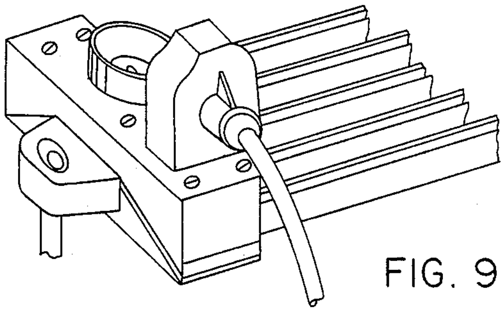
FIG. 9 is a perspective view of the contact clamp and associated contact bars.

According to a further embodiment as illustrated in FIGS. 7 and 8 the conductors 10 are arranged on the circuit board 9 differently and specifically the contact disks 11 which respectively contact via a spring one respective contact pin 5 in each of the slots 2 present for an electrical connection with one respective conductor bar of each of the contact bars are connected in series via a conductor connecting the contact disks to a pin 12 of the multiple contact plug 13. This proves true for the lower horizontal row of contact disks 11 illustrated in FIG. 7 at the right edge and identified by $I_1$ and for the center horizontal row of contact disks 11 identified by $I_2$. The meaning of the identification I is here that the respective contact disks 11 are in electrical connection with the inner bar of the contact bar. The uppermost respective contact disks 11 of the horizontal row as illustrated in FIG. 7 and having the identification A at the right hand edge are connected electrically via contact pins to an outer bar of a contact bar. In FIG. 8 a contact bar is illustrated broken. It already has been mentioned that a contact bar consists of an outer bar A having an U-shaped cross-section in which an inner bar I is set which is separated therefrom by a layer 26 of an insulating material. In the present embodiment the conductor bar forming the inner bar is divided additionally into bar sections. A bar section $I_1$ is cut out proceeding from the upper edge of a ledge shaped bar, such that the remaining bar section $I_2$ and the bar section $I_1$ supplement each other to one bar, are, however, insulated relative to each other and inserted into each other. Both bar sections $I_1$ and $I_2$ extend with one of their ends into a slot in the casing 1 in accordance with FIG. 1. This dividing of the inner bar into two bar sections has the advantage that a drop wire which has fallen due to a yarn breakage can be localized easier because, such as already mentioned it is possible to recognize at indicator devices located on the contact clamp or other suitable locations if the drop wire must be searched for on the bar section $I_1$ or the bar section $I_2$ in order to then repair the yarn breakage present at that location. In the illustrated embodiment two parallel conductors 10 are arranged by means by which the respective contact disks 11 for all bar sections $I_1$ are connected in series to one pin 12 of the multiple contact plug and in the same way all contact disks 11 for all bar sections $I_2$ are connected in series to a further pin 12 of the multiple contact plug 13. Of the totally five contact bars present every outer bar A is connected respectively by means of a separate conductor 10 connected to one pin 12 of the multiple contact plug 13. This allows to localize a drop wire which has fallen upon a warp breakage by means of indicator devices to detect on which contact bar and on which of the respective sections the drop wire is located.

While there are shown and described present preferred embodiments of the invention, it is to be distinctly understood that the invention is not limited thereto, but may be otherwise variously embodied and practiced within the scope of the following claims.

I claim:

1. A connecting clamp for use in an electrical warp stop motion device of a textile machine and operative for conducting electrical current to a plurality of contact bars, said clamp comprising a casing consisting of an insulating material and provided with a plurality of slots in adjacent parallel relationship and with resiliently supported contact pins in the bottom of each of the slots, which are adapted to receive contact bars of the stop motion device, each contact bar consisting of mutually insulated conductor bars, said casing being provided with a releasably mounted casing part for pressing said contact bars against said contact pins, wherein all contact pins are supported via springs against a circuit board mounted on said casing, said circuit board is provided with contact disks, each of which is in electrical contact with one spring of a contact pin, and is provided with conductors which electrically connect each of the contact disks with each one pin of a multiple contact plug located at the outer side of the casing for a connection to indicating devices, of which each is allocated individually to one of said contact bars.

2. The connecting clamp of claim 1, in which said circuit board is the releasable casing part for pressing said contact bars against said contact pins and is designed as casing top to be screwed tightly onto said casing and includes conductors embedded in a layer of insulating material.

3. The connecting clamp of claim 1, in which a separate casing top is the releasable casing part for pressing said contact bars against said contact pins, said casing top covers said circuit board and indicator devices such as luminating diodes are mounted on said casing top.

4. The connecting clamp of claim 1, in which said contact pins are located adjacently of each other at every slot in said casing generally relative to the slot and supported for movement, which contact pins in case of absence of said contact bars each are individually pressed against abutment surfaces in said casing by one of said pressure springs, each spring supporting itself against one of the contact disks on said circuit board, which abutment surfaces allocated to each one of said slots have differing distances from the slot bottom for allowing a contact between said contact pins and at different height level lying upper edges of the two mutually insulated conductor bars of each contact bar.

5. The connecting clamp of claim 1, in which every contact disk allocated to one contact pin is connected by a separate conductor to one of the pins of said multiple contact plug.

6. The connecting clamp of claim 1, in which those contact disks which via a spring make contact with one respective contact pin in every one of said slots for an electrical connection to one respective conductor bar of each contact bar are connected to one pin of said multiple contact plug in series via a conductor interconnecting said contact disks.

7. The connecting clamp of claim 6, in which a plurality of conductors interconnecting respective contact disks connected in series to one pin of said multiple contact plug are arranged in parallel on said circuit board, and in which those contact pins of the various parallel rows, which are arranged in the same slots, are intended for a respective contact with conductor bar sections of a same conductor bar which consists of several sections which are shaped for complementary intermeshing with one section being arranged in the other section and which extend with one end into a slot of the contact casing.

* * * * *